No. 834,691. PATENTED OCT. 30, 1906.
W. R. STURGISS.
HOEING MACHINE.
APPLICATION FILED FEB. 2, 1906.
2 SHEETS—SHEET 2.
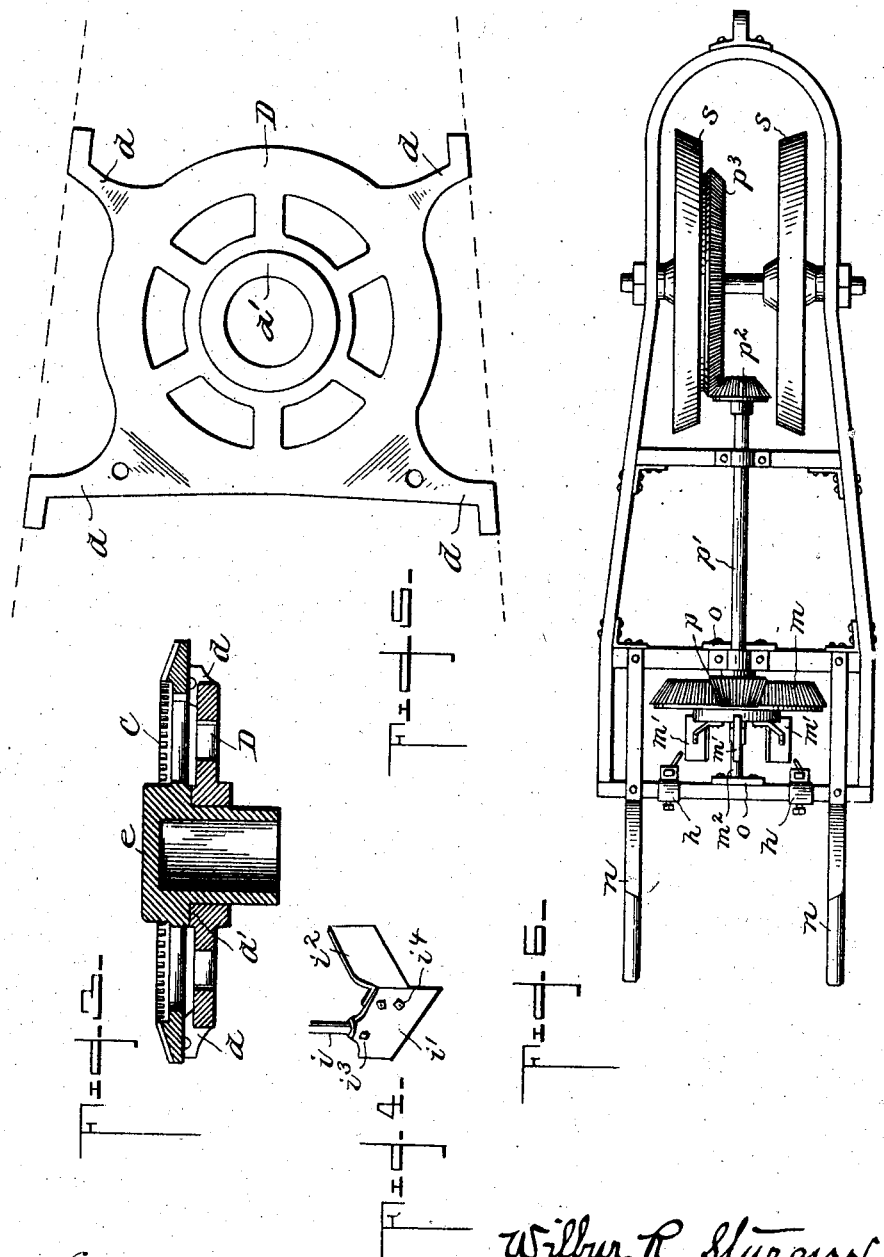
Witnesses:—
R. J. Beall.
S. E. Thomas.
Wilbur R. Sturgiss,
Inventor,
by John B. Thomas & Co.
Attorneys.

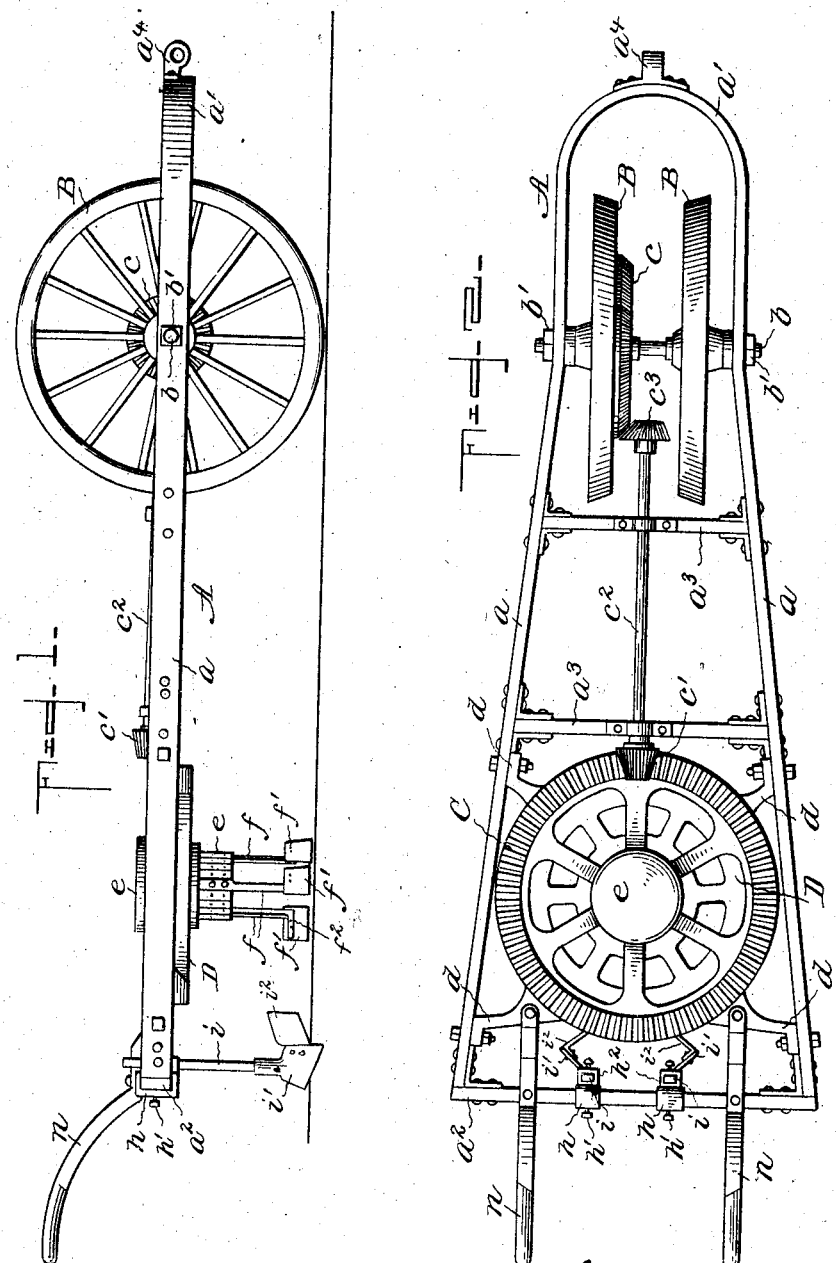

UNITED STATES PATENT OFFICE.

WILBUR R. STURGISS, OF CONWAY, ARKANSAS.

HOEING-MACHINE.

No. 834,691. Specification of Letters Patent. Patented Oct. 30, 1906.

Application filed February 2, 1906. Serial No. 299,192.

*To all whom it may concern:*

Be it known that I, WILBUR R. STURGISS, a citizen of the United States, residing at Conway, in the county of Faulkner and State of Arkansas, have invented a Hoeing-Machine, of which the following is a specification.

This invention is an improvement in agricultural machines, and relates more especially to the class of hoeing machines or cultivators.

The primary object of the invention is to provide a hoeing-machine which is drawn by horses and adapted especially for the purpose of thinning and hoeing or cultivating cotton, sorghum, beans, and other plants which are sown in the drill, whereby the required cultivation of such plants may be greatly facilitated.
The invention contemplates the provision of a machine comprising a set of revolving hoes operated from the ground-wheels through suitable gearing and adapted to thin out the plants and cultivate around those left standing, and including a pair of shovels which follow after the hoes and push a quantity of earth or dirt up around the growing plants to form the usual hills.

The construction, operation, and practical advantages of the machine are hereinafter specified, and what I claim as new in this particular art is fully set forth in the appended claims.

In the accompanying drawings, which form a part of this specification, Figure 1 is a side elevation of a hoeing-machine constructed in accordance with my invention. Fig. 2 is a plan view of the machine. Fig. 3 is an enlarged sectional view through the hoe-carrying gear-wheel and supporting-bracket for the same. Fig. 4 is a detail view of one of the shovels. Fig. 5 is a detail plan view of the supporting-bracket for the hoe-carrying gear-wheel. Fig. 6 is a plan view illustrating a modification of the invention.

Like letters of reference indicate like parts in all the figures of the drawings.

In carrying out my invention the frame A of the machine is preferably made up entirely of metal comprising flat bars, which give the required lightness with rigidity and durability, the side pieces or bars $a\,a$ being connected at their forward ends by an integral loop portion $a'$ and at their rear ends by a cross piece or bar $a^2$, intermediate cross pieces or bars $a^3\,a^3$ being provided for the purpose of bracing the frame and also to form supports for the driving-shaft hereinafter referred to. The side bars and crosspieces constituting the frame are firmly connected together by angle-plates after the usual manner of constructing a skeleton frame of this character.

At the forward end of the frame A are the ground-wheels B B, which are mounted on a transverse axle $b$, the ends of which latter pass through the side pieces of the frame to receive the securing-nuts $b'$. The periphery of the ground-wheels are preferably beveled inward, as shown, so as to give better traction, and one of said wheels is adapted to operate the hoes, for which purpose said wheel has attached to the inner side thereof a large gear-ring $c$, said gear-ring being preferably secured directly to the spokes of the wheel.

C designates a large gear-wheel, which is preferably horizontally disposed in the rear portion of the frame A, being supported upon a bracket D, the teeth of said gear-wheel being in mesh with the pinion $c'$ on the rear end of a shaft $c^2$, which latter extends longitudinally of the machine and at its forward end carries a pinion $c^3$, meshing with the gear-ring $c$ on the ground-wheel. The supporting-bracket D is provided with outwardly-projecting arms $d$, by which it is bolted to the side pieces of the frame of the machine, and centrally said bracket is formed with an opening and surrounding annular boss $d'$, upon which latter the aforesaid gear-wheel C bears. The gear-wheel is formed with a hub $e$, which depends through the supporting-bracket below the under side thereof and forms the means by which the hoes are secured to the gear-wheel, for which purpose the projecting portion of said hub is polygonal in cross-section, presenting several flat surfaces, against any one of which the flat standard $f$, carrying the hoe-blades $f'$, is bolted. As will be readily seen, the hoes are adjustable upon the hub $e$ of the rotatable gear-wheel C, and the blades are preferably adjustable upon the outwardly-projecting end $f^2$ of the standards, so that said blades may be adjusted to and from the axis of the circular path in which they move. These blades are preferably rectangular in shape, so as to present a straight rear edge which will cut or scrape close up to the growing plants and will not push them out of the ground, said blades all operating in a circle, so as to cultivate on all four sides of the hill or stand of growing plants.

On the rear cross-piece $a^2$ of the frame of the machine are slidably mounted a pair of shovel-holders $h$, which are adjustable laterally upon the frame and secured in place by means of set-screws $h'$, said holders having sockets, as $h^2$, for the standards $i$ of the shovels $i'$, the latter being adapted to operate to throw or push dirt up around the plants left standing after the hoes have operated to cultivate around them. These shovels are provided with detachable fenders $i^2$, (see Fig. 5,) which when applied serve the purpose of moving farther away from the row all grass, weeds, and plants which have been destroyed by the hoes. Each fender is formed with a lateral flange by which it is bolted to the shovel, so as to extend at an angle thereto, and the lower edge of said fender is disposed above the lower edge of the shovel, so that it will move over the top of the ground as the shovel itself enters to throw up the dirt.

The rear end of the frame of the machine is provided with handles $n$ for the operator, who manipulates the machine and walks in the rear of the same, and at the forward end of the frame there is secured an eye or loop $a^4$, to which the doubletree or other draft appliance is attached. It will be noted that the operator guides the machine by means of the handles $n$ and that the hoes and shovels may be lifted from the ground by elevating the rear end of the machine, in which movement the axle of the ground-wheels is the fulcrum.

In the operation of the machine the same is drawn by two horses, walking at either side of the row or drill, and in thinning out a row of plants the revolving hoes, which are operated from one of the ground-wheels by the gearing hereinbefore described, will cut away or remove plants from a portion of the row or drill and leave groups or stands which are spaced apart according to the adjustment of the machine. In this operation the hoes cut or work across the hills and revolving around the standing plants act to hoe or cultivate the same, while the shovels, with the attached fenders following behind the hoes, serve to first remove the cut plants and weeds and then to slide the dirt up around the plants left standing. The machine may also be used for afterward cultivating the plants, in which instance the hoes may be adjusted to cut or chop through the hills in breaking up the ground, and the shovels act to again form the hills. When desired, the speed of rotation of the gear-wheel C may be increased or diminished by changing the size of any of the gear-wheels which form the gearing between the ground-wheels and the said hoe-carrying gear-wheel.

In the modification of the invention illustrated in Fig. 6 of the drawings I have shown the hoe-carrying gear-wheel $m$ disposed vertically in the machine, so that the hoe-blades $m'$ will revolve in a vertical plane instead of a horizontal plane, as in the construction shown in Figs. 1 and 2. In this instance the blades $m'$ will cut or scrape across the row or drill and remove the plants in thinning out a row, the rear part of the machine being elevated at intervals to lift the hoes above the plants, and thereby leave a group or stand. In this modification the hoe-carrying gear-wheel is mounted on a horizontal shaft $m^2$, supported in hangers $o$ $o$, said gear-wheel being in mesh with a pinion $p$ on the rear end of a shaft $p'$, which latter is provided at its forward end with a pinion $p^2$ in mesh with a gear-ring $p^3$, secured to one of the ground-wheels $s$.

From the foregoing it will be readily seen that I provide a hoeing-machine which is drawn by horses and can be easily operated to greatly reduce the time and labor required to thin out plants sown in the drill and to cultivate such plants.

Having thus described my invention, what I claim as new, and desire to secure by Letters Patent, is—

1. In a hoeing-machine, the combination with a frame supported upon wheels at its forward end and provided with handles at its rear end, of a gear-ring secured to one of the supporting-wheels, a gear-wheel rotatably mounted in the rear end of the frame, a shaft having pinions at its ends in mesh with the gear-ring and gear-wheel respectively, and hoes carried by said gear-wheel.

2. In a hoeing-machine, the combination with a frame supported upon wheels at its forward end and provided with handles at its rear end, of a gear-ring secured to one of the ground-wheels, a gear-wheel mounted horizontally in the rear end of the frame upon a bracket, the hub of said gear-wheel projecting below the bracket, said projecting end being polygonal in cross-section, forming a number of flat sides, the latter provided with screw-holes, and hoes having standards by which they are secured to said flat sides of the hub substantially as shown and described.

3. In a hoeing-machine, the combination with a frame supported upon wheels at its forward end and having handles at its rear end, a horizontally-disposed bracket secured in the rear end of the frame and having a central opening with a surrounding annular bearing-surface, a gear-wheel rotatably mounted on the bracket to bear upon said annular surface and having a hub projecting through the central opening in said bracket, hoes having standards by which they are secured to the lower end of the hub, and gearing between the aforesaid gear-wheel and one of the ground-wheels of the machine, substantially as herein shown and described.

4. In a hoeing-machine, the combination with a frame comprising flat side bars and cross-bars connected thereto, of ground-wheels mounted in the forward end of the frame between the side bars thereof, a horizontally-disposed bracket secured within the rear end of the frame and having a central opening with a surrounding annular boss forming a bearing-surface, a gear-wheel loosely mounted on the bracket and having a hub projecting downwardly through the opening therein, the lower end of said hub being provided with a number of flat sides having screw-holes, flat standards secured to the flat sides of the hub, blades secured to said standards at an angle thereto, and gearing between the aforesaid gear-wheel and one of the ground-wheels, as herein shown and described.

In testimony whereof I have signed my name to this specification in the presence of two subscribing witnesses.

WILBUR R. STURGISS.

Witnesses:
W. T. HANNERS,
BRUCE T. BULLION.